United States Patent
Song et al.

(10) Patent No.: US 12,184,794 B2
(45) Date of Patent: Dec. 31, 2024

(54) APPARATUS FOR QUANTUM-BASED PHYSICALLY UNCLONABLE FUNCTIONS

(71) Applicants: GWANGJU INSTITUTE OF SCIENCE AND TECHNOLOGY, Gwangju (KR); PURDUE RESEARCH FOUNDATION, West Lafayette, IN (US)

(72) Inventors: Young Min Song, Gwangju (KR); Young Lae Kim, West Lafayette, IN (US); Seung Ho Choi, West Lafayette, IN (US); Min Seok Kim, Gwangju (KR); Jung Woo Leem, West Lafayette, IN (US)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 719 days.

(21) Appl. No.: 17/055,557

(22) PCT Filed: May 15, 2019

(86) PCT No.: PCT/KR2019/005857
§ 371 (c)(1),
(2) Date: Mar. 8, 2021

(87) PCT Pub. No.: WO2019/221520
PCT Pub. Date: Nov. 21, 2019

(65) Prior Publication Data
US 2021/0218582 A1    Jul. 15, 2021

(30) Foreign Application Priority Data
May 15, 2018   (KR) .......................... 10-2018-0055678

(51) Int. Cl.
| H04L 9/32 | (2006.01) |
| G06N 10/00 | (2022.01) |
| H04L 9/08 | (2006.01) |

(52) U.S. Cl.
CPC .......... H04L 9/3278 (2013.01); G06N 10/00 (2019.01); H04L 9/0852 (2013.01)

(58) Field of Classification Search
CPC ...... H04L 9/3278; H04L 9/0852; G06N 10/00
See application file for complete search history.

(56) References Cited

U.S. PATENT DOCUMENTS

| 10,056,905 B1 * | 8/2018 | Bowers, II ............ H04L 9/0866 |
| 2009/0235862 A1 * | 9/2009 | Cha ......................... C30B 29/16 |
| | | 117/94 |

(Continued)

FOREIGN PATENT DOCUMENTS

| KR | 20060091509 A | 8/2006 |
| KR | 20080108734 A | 12/2008 |

(Continued)

OTHER PUBLICATIONS

Dong, JJ., Zhen, CY., Hao, HY. et al., "Controllable synthesis of ZnO nanostructures on the Si substrate by a hydrothermal route". Nanoscale Res Lett 8, 378 (2013). (Year: 2013).*

(Continued)

Primary Examiner — Jeremy S Duffield
(74) Attorney, Agent, or Firm — LOZA & LOZA LLP; Heidi L. Eisenhut

(57) ABSTRACT

An apparatus for quantum-based physically unclonable functions is disclosed. The apparatus for quantum-based physically unclonable functions according to an embodiment of the present embodiment comprises a random nanostructure formed on a substrate by hydrothermal synthesis, wherein the random nanostructure emits a laser light of a (Continued)

predetermined pattern through the quantum activity of the random nanostructure.

6 Claims, 22 Drawing Sheets

(56) References Cited

U.S. PATENT DOCUMENTS

| | | | | |
|---|---|---|---|---|
| 2010/0156272 | A1* | 6/2010 | Kim | H01J 29/04 |
| | | | | 445/35 |
| 2012/0168506 | A1* | 7/2012 | Ruehrmair | G06F 21/73 |
| | | | | 235/454 |
| 2012/0305069 | A1* | 12/2012 | Kim | B82Y 20/00 |
| | | | | 977/948 |
| 2014/0065766 | A1 | 3/2014 | Lin et al. | |
| 2014/0175422 | A1* | 6/2014 | Barabash | H10N 70/20 |
| | | | | 977/932 |
| 2014/0303931 | A1* | 10/2014 | Suzuki | B82Y 10/00 |
| | | | | 702/179 |
| 2015/0103340 | A1* | 4/2015 | Gibson | G01N 21/658 |
| | | | | 977/932 |
| 2019/0189840 | A1* | 6/2019 | Tsai | H10N 30/85 |
| 2019/0241804 | A1* | 8/2019 | Aboulaich | C09K 11/025 |
| 2020/0210697 | A1* | 7/2020 | Roberts | G06K 19/16 |

FOREIGN PATENT DOCUMENTS

| | | |
|---|---|---|
| KR | 20130132033 A | 12/2013 |
| KR | 20150090939 A | 8/2015 |

OTHER PUBLICATIONS

Choi et al. "Revisitation of ZnO random lasers toward optical security." Conference on Lasers and Electro-Optics (CLEO) San Jose, CA (May 13-18, 2018).

Choi et al. Poster. "Random Lasers toward Quantum Cryptography." Conference on Lasers and Electro-Optics (CLEO) San Jose, CA (May 13-18, 2018).

Program Book. Conference on Lasers and Electro-Optics (CLEO) San Jose, CA (May 13-18, 2018).

International Search Report for PCT/KR2019/005857 (May 15, 2019).

* cited by examiner

 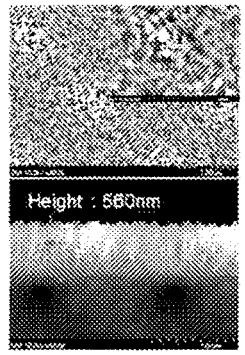 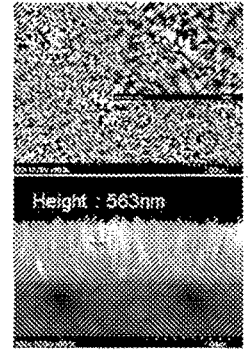 
FIG. 5A   FIG. 5B   FIG. 5C   FIG. 5D
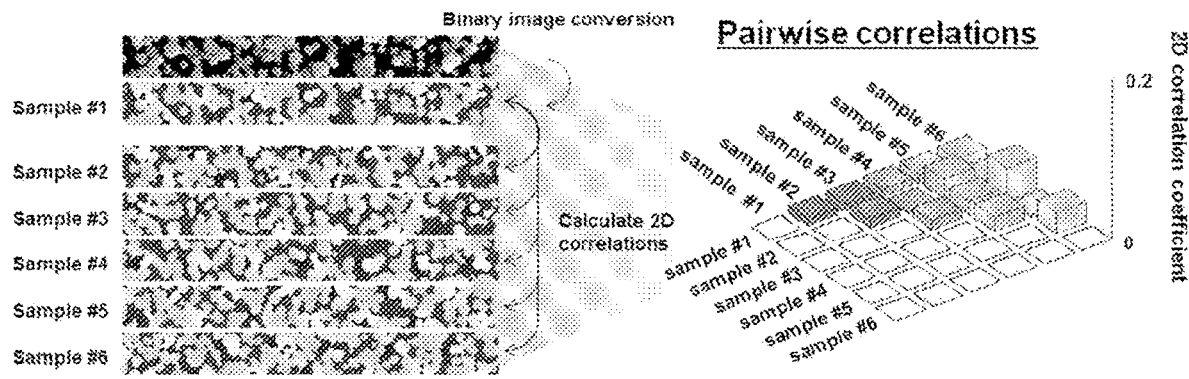
FIG. 6A
FIG. 6B

FIG. 10
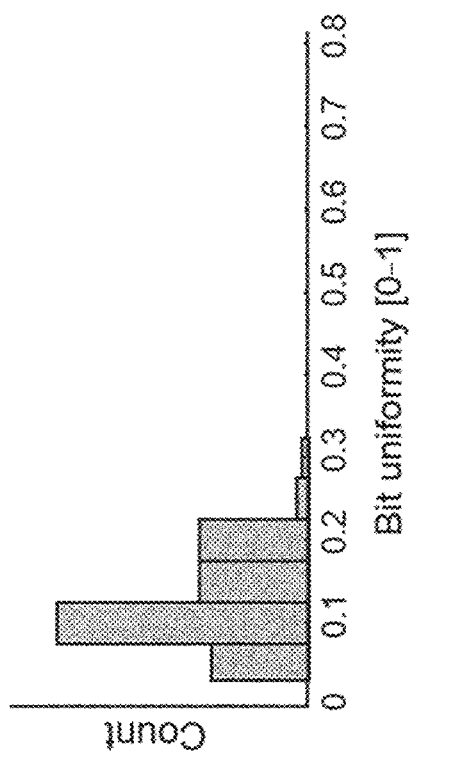
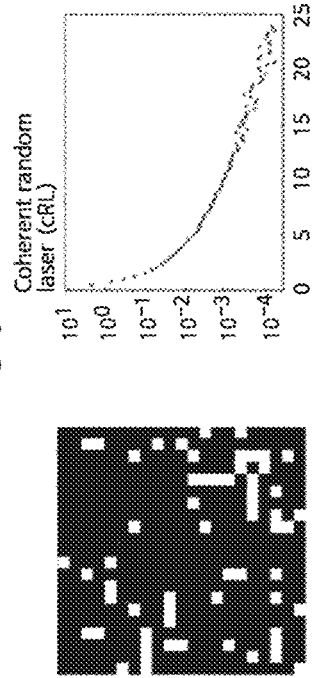
Random lasing pattern
High entropy : i.e. Poisson distribution
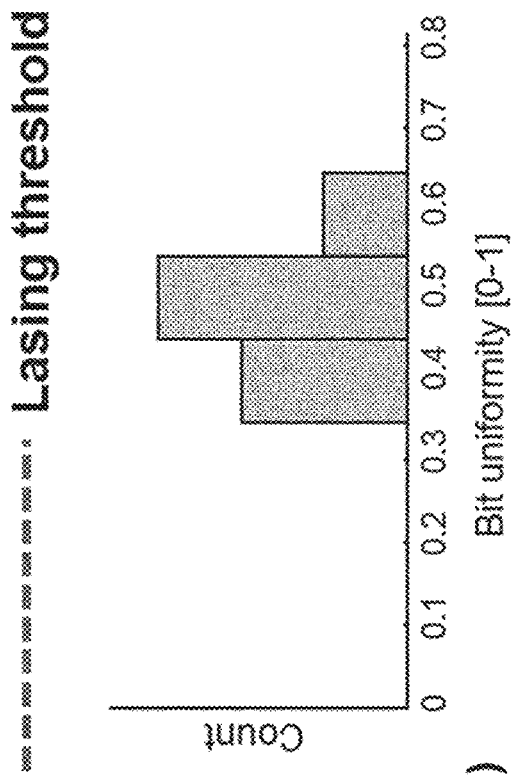
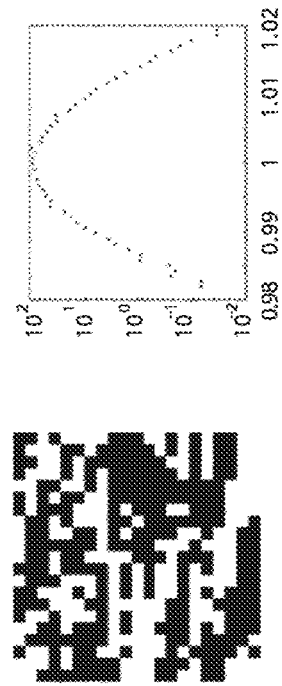
Lasing threshold
Spontaneous emission pattern
Low entropy: (i.e. Gaussian distribution)
Excitation energy

FIG. 13
x-y intensity pattern at $\lambda_1$
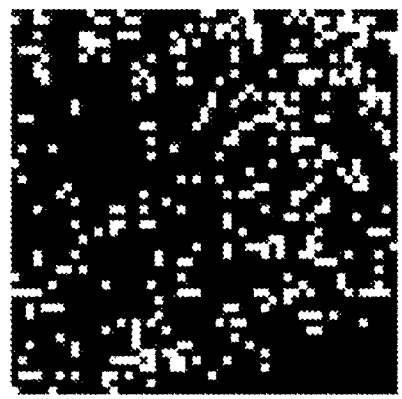
x-y intensity pattern at $\lambda_2$
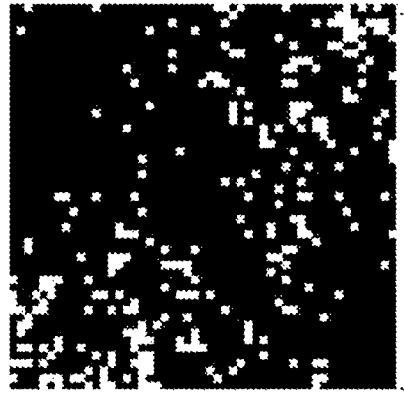
500 μm (50 pixels)
500 μm (50 pixels)
FIG. 14
1. Inter-Wavelength Hamming distance (HD)
Chip A
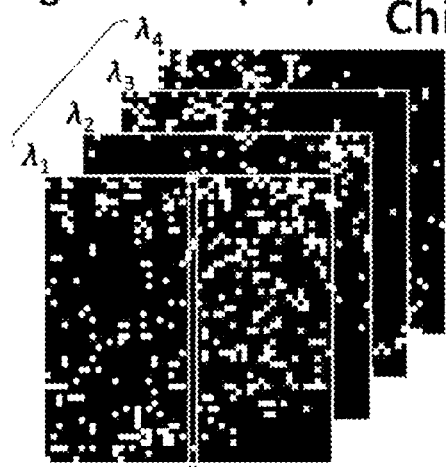
Chip B
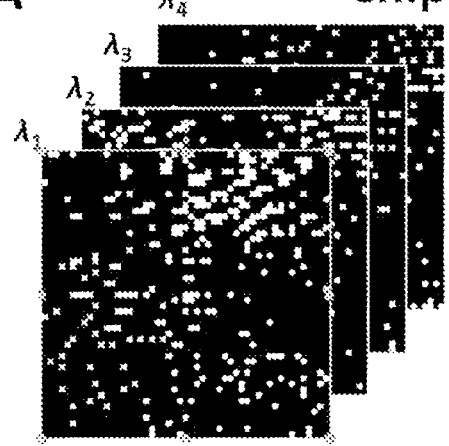
2. Inter-Location Hamming Distance (HD)
3. Inter-Chip Hamming distance (HD)

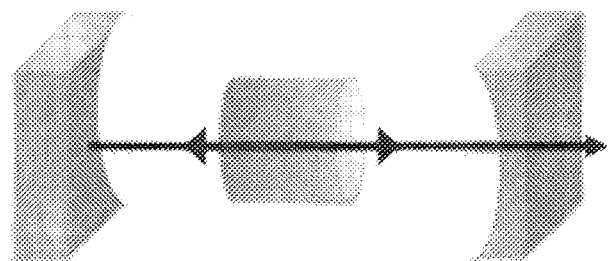
FIG. 18A  Conventional laser
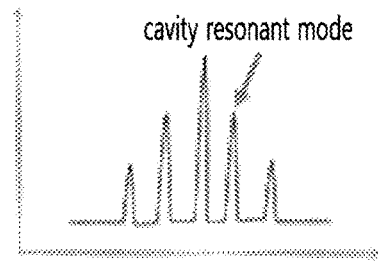
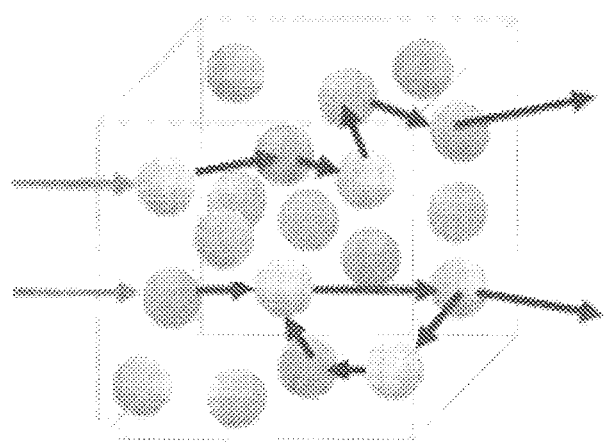
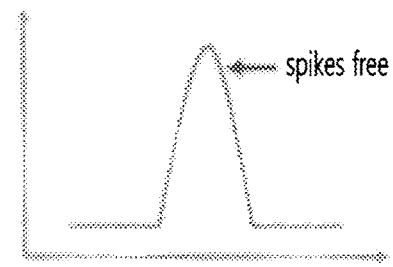
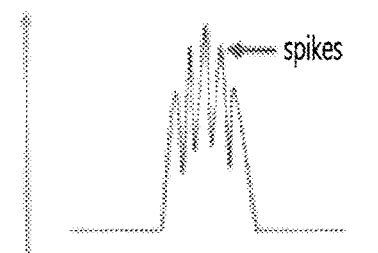
FIG. 18B  random laser
FIG. 18C  Laser output FIG. 21
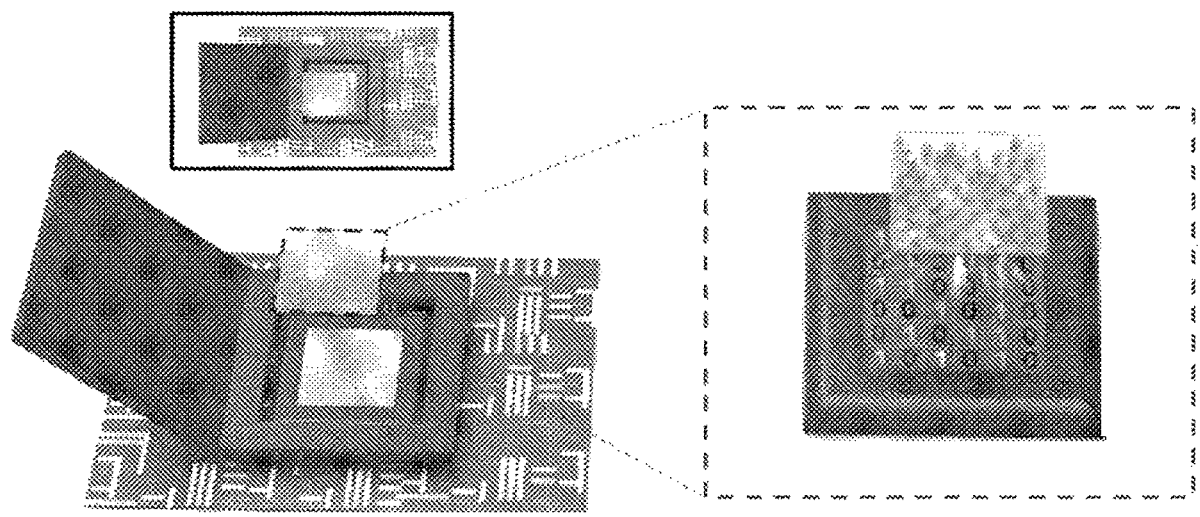
Image sensor Sampling
(key size rescale)
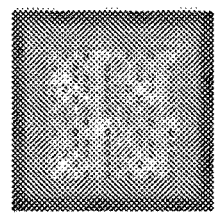   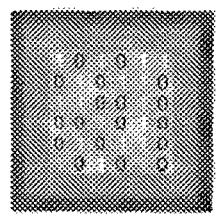
(12X12)              (6X6)

APPARATUS FOR QUANTUM-BASED PHYSICALLY UNCLONABLE FUNCTIONS

TECHNICAL FIELD

The present invention relates to a quantum-based physical unclonable function device capable of generating a laser pattern following a Poisson distribution while having high entropy through quantum activity of a random nanostructure.

BACKGROUND ART

Recently, as modernization of smart grid systems and financial systems is accelerating and financial damage caused by information leakage is increasing exponentially, efforts are being made to develop next-generation encryption systems for preventing security damage.

Existing information security refers to a method of using software (SW)-based encryption algorithms and storing a classical security key in a nonvolatile memory using an encryption application program. However, this method is very vulnerable to physical intrusion attacks and may be subjected to intrusion by computation with development of high-performance computers.

Accordingly, recently, higher-dimensional hardware (HW)-based physical security technology tends to be used. Among them, an encryption method of forming a unique security key in hardware using physically unclonable functions (PUFs) is attracting attention.

In the early studies of the PUFs, silicon-based integrated PUFs were mainly studied. However, recently, optical-based PUFs which use light scattering patterns for encryption, graphene, carbon nanotubes and MEMS-based advanced PUFs are being studied.

However, PUF encryption devices reported so far do not have high entropy, and, in conventional silicon PUF methods having low entropy, such as signal delay-based and memory-based PUFs, a light pattern basically follows a Gaussian normal distribution. Accordingly, since an average of randomness of a light pattern becomes close to 0, additional preprocessing and postprocessing for a formed security key are disadvantageously necessary.

INVENTION

Technical Problem

An object of the present invention is to provide a quantum-based physical unclonable function apparatus capable of generating a laser pattern following a Poisson distribution while having high entropy through quantum activity of a random nanostructure.

Technical Solution

A quantum-based physical unclonable function (PUF) apparatus including a random nanostructure formed on a substrate by a hydrothermal synthesis method, wherein the random nanostructure emits a laser light having a certain pattern through quantum activity of the random nanostructure.

Effect of the Invention

According to the present invention, by generating a physical structure having randomness in a process and generating a random pattern having quantum-based random characteristics by quantum activity in a random structure, the oscillation pattern of the laser follows the Poisson distribution. That is, even when a PUF device is manufactured using the same method, the unique characteristics thereof cannot be cloned.

In addition, according to the present invention, since the PUF device is manufactured using randomness based on various physical phenomena such as semiconductor manufacturing processes using silicon, compound combination or optics, this may be applied to various advanced security apparatuses as the physical security technology with strong security performance.

In addition, according to the present invention, since multi-wavelength and multi-mode oscillation occurs due to light scattering characteristics and a virtual resonance structure, the amount of information which may be used for security may increase, thereby improving security.

In addition, the random nanostructure very stably emits the same pattern at the same temperature and current, thereby being very advantageously used as an encryption device.

In addition, the manufacturing process is very easy, thereby generating a large number of keys.

DESCRIPTION OF DRAWINGS

FIGS. 5a-5d are views showing random nanostructures grown under different generation conditions.

FIGS. 6a and 6b are views for comparison of correlation between various random nanostructures generated under the same generation condition according to an embodiment of the present invention.

FIG. 10 is a view for comparison between a pattern of a random laser according to an embodiment of the present invention and a pattern of a general laser.

FIGS. 11 and 12 are views illustrating characteristics of a wavelength among oscillation characteristics of a random laser.

FIG. 13 is a view showing a bitmap of pattern images acquired at different wavelengths of the same sample.

FIGS. 14, 15a and 15b are views illustrating a result of calculating a hamming distance using pattern images acquired at a plurality of wavelengths and a plurality of samples.

FIGS. 18a, 18b and 18c are views showing data for comparison between a general laser and a random laser.

FIGS. 21 to 23 are views illustrating a method of utilizing a random laser device for hardware security.

BEST MODE

Hereinafter, specific embodiments of the present invention will be described in detail with reference to the drawings. However, the spirit of the present invention is not limited to the following embodiments, and those skilled in the art who understand the spirit of the present invention can easily propose other embodiments included within the scope of the same idea, by adding, changing, deleting, and adding components. The other embodiments are included in the scope and spirit of the present invention.

In the accompanying drawings, in order to easily express the spirit of the invention, when describing the overall structure, minute parts may not be specifically expressed, and when describing minute parts, the overall structure may not be specifically reflected. In addition, even if the specific parts such as installation positions are different, if the operations thereof are the same, the same name is given, so that convenience of understanding can be improved. In addition, when there are a plurality of identical components, only one component will be described, the same description will be applied to the other components, and the description thereof will be omitted.

Figure 1:
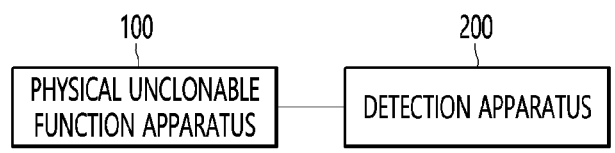
FIGS. 1 and 2 are block diagrams illustrating a quantum-based physical unclonable function system according to an embodiment of the present invention.
Figure 2:
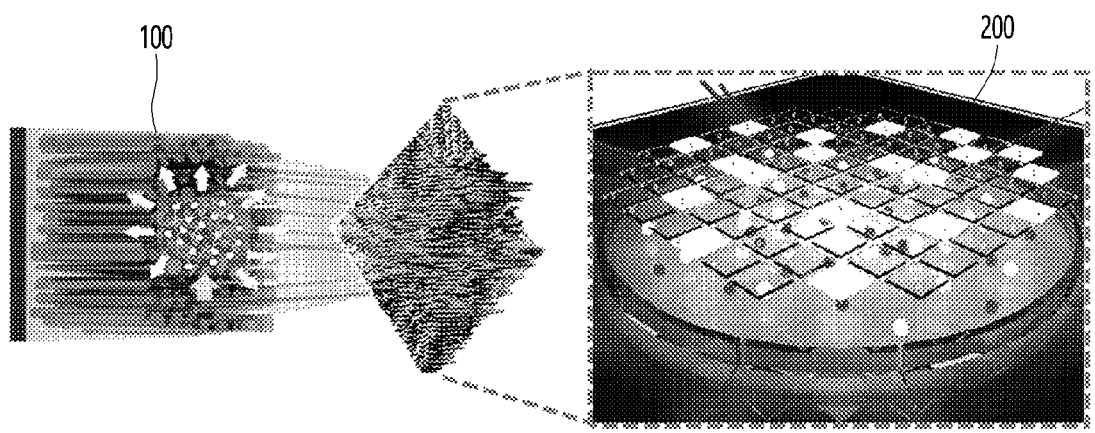

FIGS. 1 and 2 are block diagrams illustrating a quantum-based physical unclonable function system according to an embodiment of the present invention.

The quantum-based physical unclonable function system may include a physical unclonable function apparatus 100 and a detection apparatus 200.

The physical unclonable function apparatus 100 may include a random nanostructure, and a laser having a certain pattern may oscillate by activating a quantum using a nanostructure. In this case, the nanostructure may be formed using a hydrothermal synthesis method to have a random shape, and a laser oscillating thereby may also have a random pattern which cannot be predicted and cloned.

In addition, the physical unclonable function apparatus 100 may include an energy supply apparatus for supplying excitation energy to the random nanostructure. Specifically, the physical unclonable function apparatus 100 may include a light supply apparatus when the excitation energy is light energy and include an electricity supply apparatus when the excitation energy is electrical energy.

The detection apparatus 200 may detect the pattern of the laser oscillating in the physical unclonable function apparatus 100.

Specifically, the detection apparatus 200 may include an image sensor for receiving the laser oscillating in the random nanostructure to acquire an image.

In this case, the pattern of the laser oscillating in the random nanostructure may be recorded in the acquired image. An image in which the pattern of the laser oscillating in the random nanostructure is recorded by photographing the random nanostructure may be referred to as a pattern image.

Meanwhile, when the pattern image is acquired, a processor of the detection apparatus 200 may perform authentication using the pattern image and authentication information. In this case, the detection apparatus may include a memory for storing the authentication information.

Figure 3:
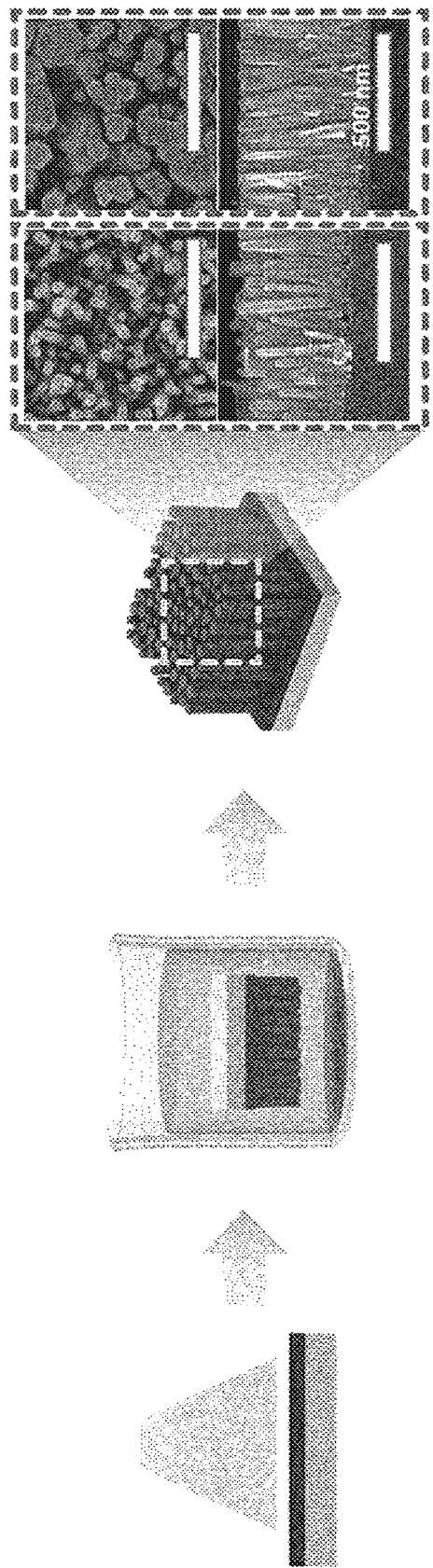
FIG. 3 is a view illustrating a method of generating a random nanostructure according to an embodiment of the present invention.

FIG. 3 is a view illustrating a method of generating a random nanostructure according to an embodiment of the present invention.

Figure 4:
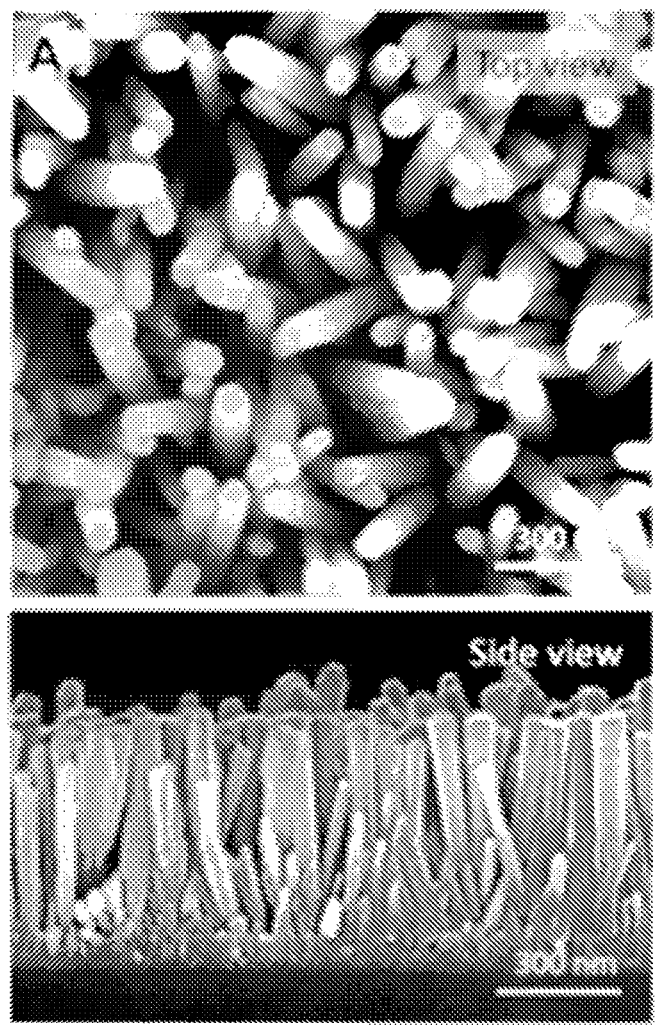
FIG. 4 is a plan view and a side view of a random nanostructure formed by a hydrothermal synthesis method according to an embodiment of the present invention.

FIG. 4 is a plan view and a side view of a random nanostructure formed by a hydrothermal synthesis method according to an embodiment of the present invention.

The random nanostructure may be formed on a substrate using a hydrothermal synthesis method.

As materials configuring the random nanostructure, various materials may be used. However, hereinafter, it is assumed that the random nanostructure is composed of zinc oxide.

Here, the random nanostructure may mean a high-density structure having a disordered shape, that is, an irregular shape (a disordered geometry).

In addition, the random nanostructure may be formed using a hydrothermal synthesis method.

Specifically, first, a zinc oxide (ZnO) seed layer 320 may be formed on a substrate 310. Here, the seed layer 320 may refer to a layer capable of growing the random nanostructure. For high-quality crystallization, the seed layer 320 may be deposited by sputtering.

In addition, when the substrate 310 on which the seed layer 320 is formed is put into a mixed solution of zinc nitrate hexahydrate and hexamethylenetetramine, the random nanostructure 330 composed of zinc oxide (ZnO) on the seed layer 320 may be vertically grown.

In this case, the density and size of nonorods grown by the hydrothermal synthesis method may be variously determined according to generation conditions (molar concentration of the mixed solution, a growth time, a growth temperature, etc.).

Meanwhile, the random nanostructure may be grown using an electrochemical vapor deposition method of applying a voltage to the substrate.

The random nanostructure generated using the hydrothermal synthesis method may include nanorods aligned disorderly in a vertical direction.

Meanwhile, the nanorods aligned disorderly in the vertical direction is merely an example of the random nanostructure, and a random nanostructure having an irregular shape (disordered geometry) is enough.

FIGS. 5a-5d are views showing random nanostructures grown under different generation conditions.

FIG. 5a shows a random nanostructure grown in a mixed solution having a concentration of 10 mM for 3 hours, FIG. 5b shows a random nanostructure grown in a mixed solution having a concentration of 10 mM for 6 hours, FIG. 5c shows a random nanostructure grown in a mixed solution having a concentration of 30 mM for 3 hours, and FIG. 5d shows a random nanostructure grown in a mixed solution having a concentration of 30 mM for 6 hours.

It can be seen that from FIG. 5a that the lengths of the nanorods are determined according to a growth time and the thicknesses of the nanorods are determined according to the concentration of the mixed solution.

FIGS. 6a and 6b are views for comparison of correlation between various random nanostructures generated under the same generation condition according to an embodiment of the present invention.

The random nanostructure according to the embodiment of the present invention have a different shape from another random nanostructure generated under the same generation condition.

That is, the random nanostructure has an irregular shape (disordered geometry). Accordingly, a plurality of random nanostructures generated under the same generation condition (the same molar concentration, the same growth temperature and the same growth time) may have different shapes.

In FIGS. 6a and 6b, scanning electron microscope (SEM) images of six samples (six random nanostructures) generated under the same generation condition are obtained and converted into binary images. Here, scanning electron microscope (SEM) images may be plan views of the random nanostructure.

Correlations between the binary images of the samples may be obtained by the following equation.

$$2D \text{ correlation} = \frac{\sum_m \sum_n (A_{mn} - \overline{A})(B_{mn} - \overline{B})}{\sqrt{\left(\sum_m \sum_n (A_{mn} - \overline{A})^2\right)\left(\sum_m \sum_n (B_{mn} - \overline{B})^2\right)}} \quad \text{Equation 1}$$

$\overline{A}$ = Average of image $A$ $\overline{B}$ = Average of image $B$

It was confirmed that the correlations between the binary images of six samples (six random nanostructures) are lower than 0.2.

That is, this means that there is no correlation between the six samples (six random nanostructures), which means that different random nanostructures are generated even under the same generation condition and physical clone is impossible.

Figure 7:
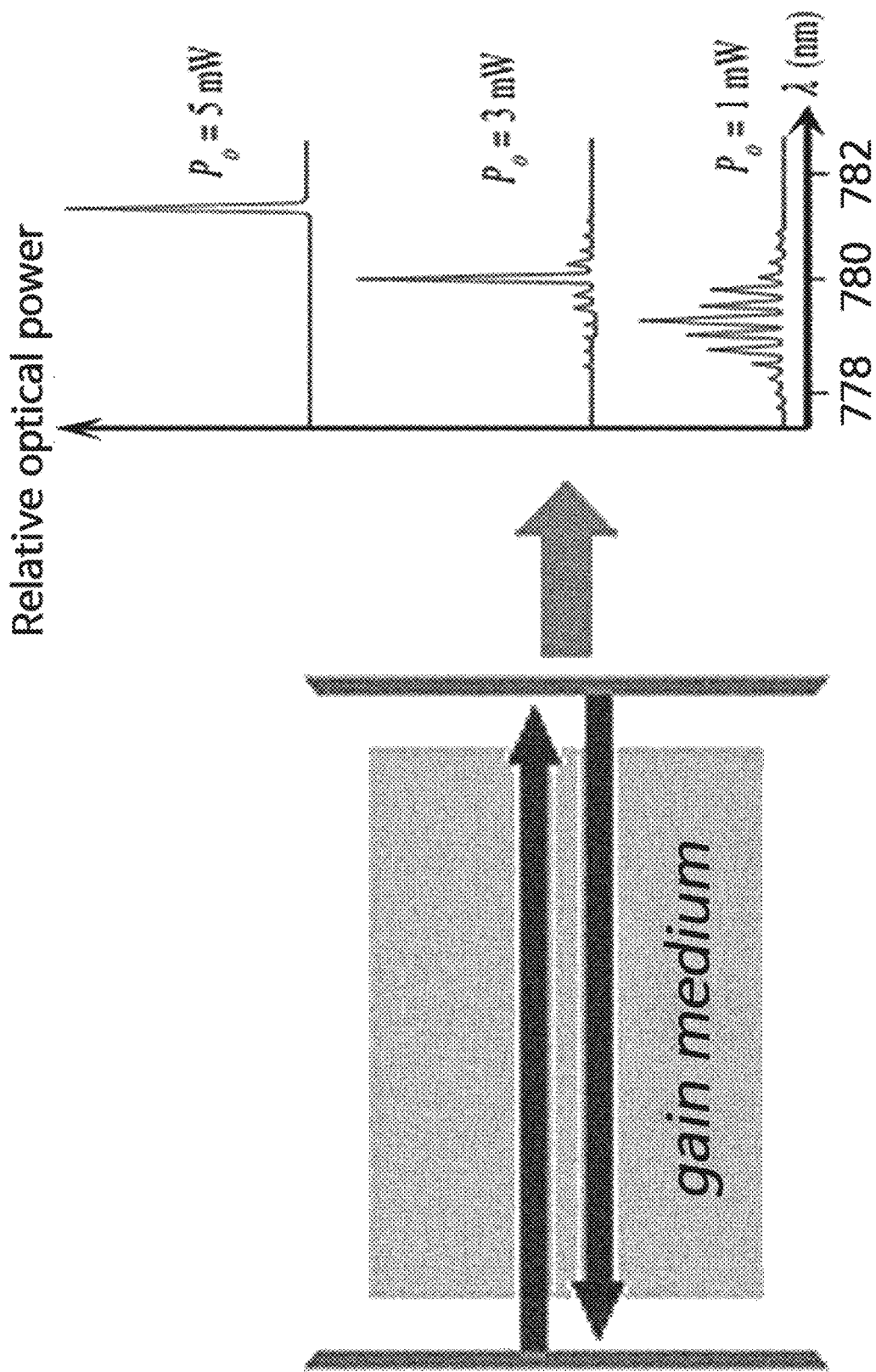
FIGS. 7 and 8 are views for comparison between a general laser and a random laser according to an embodiment of the present invention.
Figure 8:
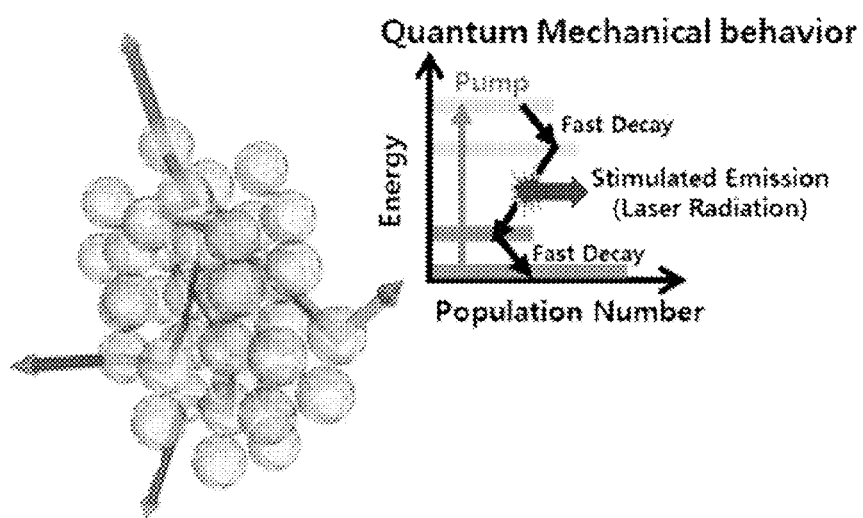

FIGS. 7 and 8 are views for comparison between a general laser and a random laser according to an embodiment of the present invention.

FIG. 7 is a view illustrating a general laser.

Referring to FIG. 7, there is a resonance structure (cavity) including opposing mirrors and there is a gain medium in the resonance structure (cavity). In the resonance structure (cavity), light reflects at both mirrors and countlessly reciprocates, thereby being amplified. Therefore, light (laser) oscillates and such a laser may oscillate as light having the same wavelength and direction due to a finely-tuned resonance structure (cavity).

FIG. 8 is a view illustrating a random laser according to an embodiment of the present invention.

In the random nanostructure of the present invention, the random laser may oscillate.

Here, the random laser does not mean that a random laser oscillates whenever excitation energy is input or with passage of time. That is, the random laser may mean that a laser having a pattern which cannot be predicted or cloned by the irregular shape (disordered geometry) of the random nanostructure oscillates.

Specifically, the random nanostructure for oscillation of the random laser does not have a resonator unlike the general laser.

In addition, the random nanostructure includes a gain medium and a scattering medium. In the disordered geometry of the random nanostructure, a random laser formed through quantum activity of the random nanostructure may oscillate.

Specifically, light paths may be variously formed by multiple scattering of the scattering medium included in the random nanostructure having the irregular shape. In addition, light may be amplified by the gain medium included in the random nanostructure. That is, the random nanostructure of the present invention does not have the same resonance structure as the general laser, but the random laser may oscillate by forming a feedback loop using the irregular shape. The feedback loop formed by the shape of the random nanostructure may be referred to as a virtual resonance structure.

In addition, the random nanostructure having the irregular shape and a light amplification phenomenon due to storing scattering of the random nanostructure may cause stimulated emission of the laser. In particular, the random laser may have a random pattern following a Poisson distribution which is a basic requirement of a quantum while having high entropy, by strong scattering through Anderson light localization.

That is, essential randomness of the quantum and the quantum activation effect of the random nanostructure, oscillation of a laser having a random pattern and having very low predictability is possible.

In addition, due to light scattering characteristics of the random nanostructure, a multi-wavelength random laser may oscillate.

Meanwhile, the random laser may mean that a laser having a pattern which cannot be predicted or cloned by the irregular shape (disordered geometry) of the random nanostructure oscillates. Since one random nanostructure has deterministic resonances, a laser having a certain pattern (one pattern or a unique pattern) may oscillate.

Specifically, at the same temperature and the same excitation energy, the random nanostructure may oscillate a laser having a certain pattern (one pattern or a unique pattern).

As described above, the random nanostructure has a different shape from another random nanostructure generated under the same generation condition.

That is, even the other random nanostructure may oscillate a laser having a unique pattern. Accordingly, the random nanostructure may oscillate a laser having a different pattern from another nanostructure generated under the same generation condition.

Meanwhile, the certain pattern (unique pattern) of the laser oscillating in the random nanostructure may include at least one of an oscillation point of the laser or an oscillation direction of the laser.

Specifically, due to the irregular shape of the random nanostructure, the feedback loop may also be irregularly formed. Therefore, the oscillation point of the laser and the oscillation direction of the laser may be randomly (unpredictably) determined, but one random nanostructure may oscillate a laser at a certain point in a certain direction.

Here, the point may mean a point on a plane (x-y plane) on which a laser oscillates in the random nanostructure.

In addition, the plane (x-y plane) on which the laser oscillates in the random nanostructure may include very numerous points and a laser may oscillate at some points. Points on which the laser oscillates at the same temperature and the same excitation energy may always be the same.

In addition, the lasers oscillate in random directions at a plurality of points on which the laser oscillates, but the direction of the laser oscillating at one point may always be the same at the same temperature and the same excitation energy.

Figure 9:
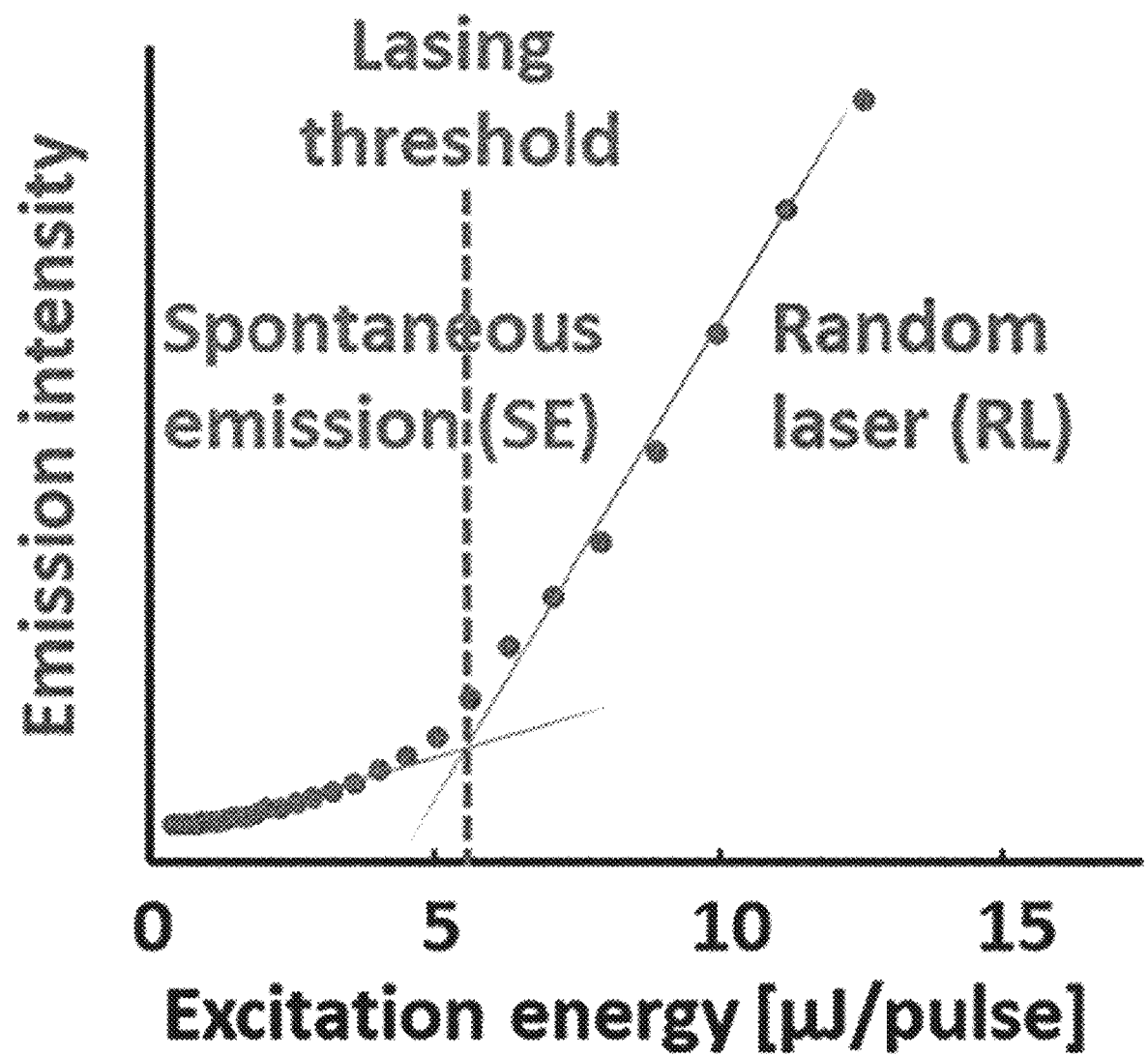
FIG. 9 is a view illustrating a method of generating a random laser according to an embodiment of the present invention.

FIG. 9 is a view illustrating a method of generating a random laser according to an embodiment of the present invention.

Referring to FIG. 9, when excitation energy having a predetermined value (lasing threshold shown in FIG. 9) or more is input, the random nanostructure may oscillate a laser having a certain pattern in by a virtual resonance structure.

Specifically, when excitation energy is input, the random nanostructure may be excited and thus emission may occur.

In addition, when excitation energy of less than the predetermined value is input, spontaneous emission occurs in the random nanostructure similar to a conventional commercial laser.

However, when excitation energy having the predetermined value (lasing threshold shown in FIG. 9) or more is input, the random nanostructure emits ultraviolet rays and the emitted ultraviolet rays may oscillate as a random laser having a certain pattern (unique pattern) due to scattering effect through the virtual resonance structure of the random nanostructure.

In addition, this certain pattern (unique pattern) is not changed over time due to Anderson localization. Accordingly, the random nanostructure may be used as a physical unclonable function device.

Meanwhile, the excitation energy may be light energy or electrical energy. When the excitation energy is light energy, light having a certain intensity or more is input and, when the excitation energy is electrical energy, current having a certain level is input. When light or current is input to the random nanostructure, the random nanostructure may oscillate the laser having the certain pattern by the virtual resonance structure.

FIG. 10 is a view for comparison between a pattern of a random laser according to an embodiment of the present invention and a pattern of a general laser.

FIG. 10 shows a pattern image acquired by receiving and imaging a laser oscillating in a random nanostructure and a pattern image acquired by receiving and imaging a general laser.

That is, the pattern image may be acquired by photographing the plane (x-y plane) on which the laser oscillates in the random nanostructure using an image sensor or another laser detection apparatus.

Here, a white region of the pattern image means a region where a laser is received on the image sensor (or a region where a laser having an intensity greater than a predetermined value is received), and a black region means a region where a laser is not received on the image sensor (or a region where a laser having an intensity less than the predetermined value is received).

A PUF encryption device using a general laser has low entropy (randomness) and a light pattern follows a Gaussian normal distribution. Accordingly, there is a problem that an average of randomness of the light pattern is close to 0.

However, when excitation energy having the predetermined value (lasing threshold shown in FIG. 9) or more is input to the random nanostructure such that the random laser oscillates, the pattern of the laser displayed on the pattern image may have high entropy (randomness) following a Poisson distribution.

Figure 11:
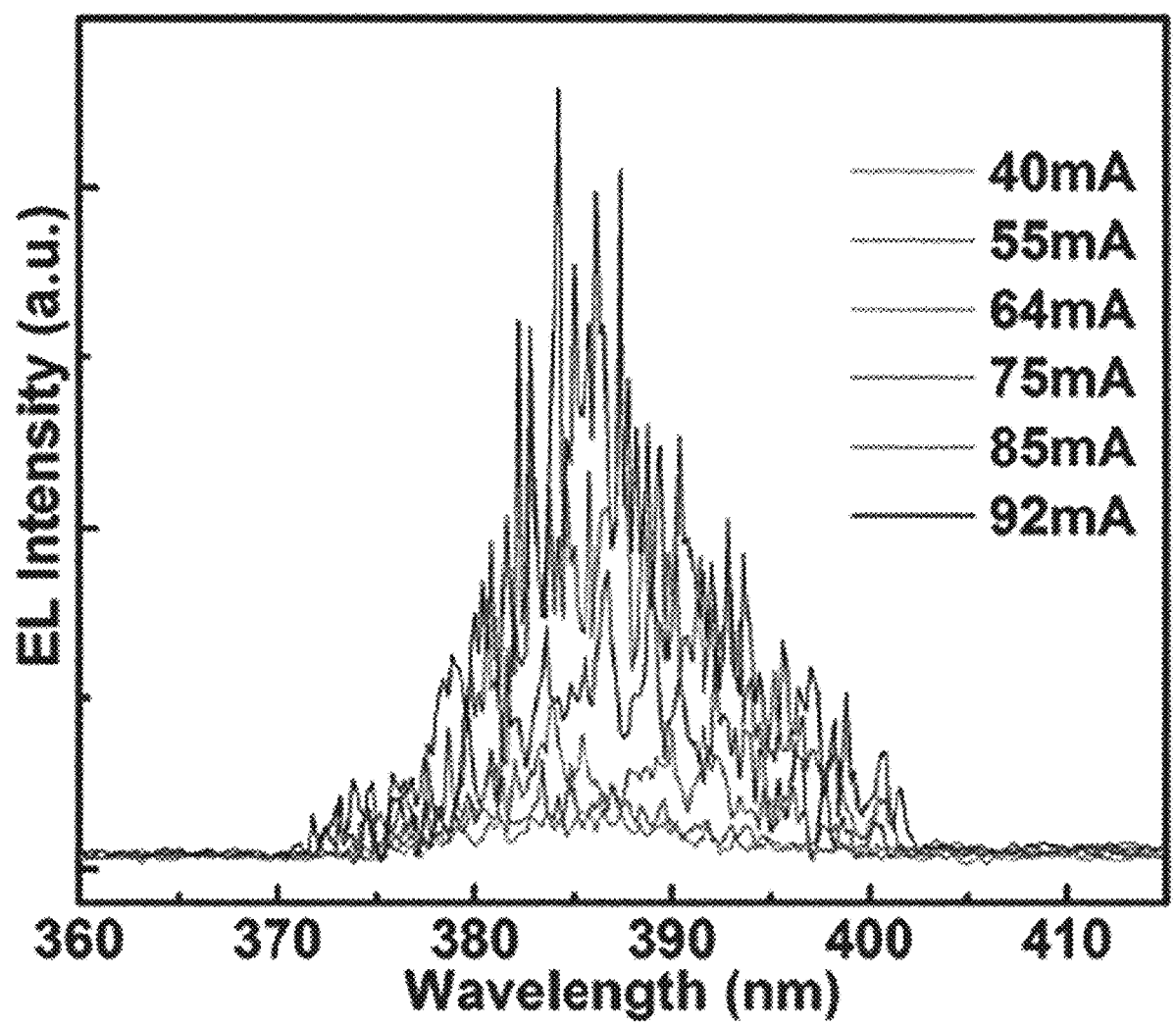

FIGS. 11 and 12 are views illustrating characteristics of a wavelength among oscillation characteristics of a random laser.

The pattern of the laser oscillating in the random nanostructure may include the wavelength of the laser.

Specifically, by the virtual resonance structure of the random nanostructure, lasers having a plurality of wavelengths may oscillate in an emission spectrum of the random nanostructure.

For example, the random nanostructure composed of zinc oxide may have an emission spectrum from 370 nm to 400 nm. In this case, the random nanostructure may oscillate lasers having various wavelengths in a range from 370 nm to 400 nm.

Figure 12A:
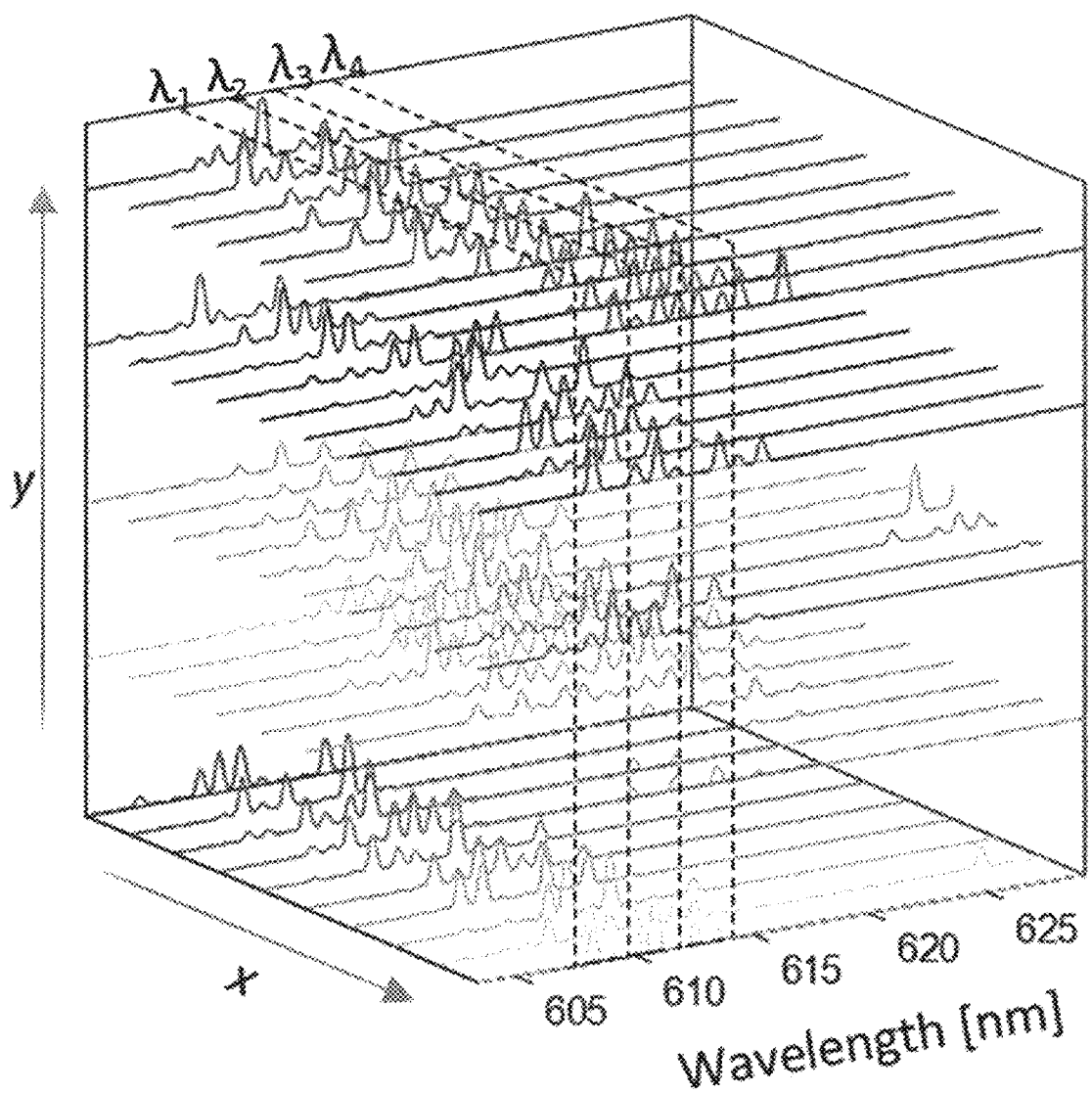
FIGS. 12a and 12b are views showing a plurality of wavelengths oscillating at a plurality of points.
Figure 12B:
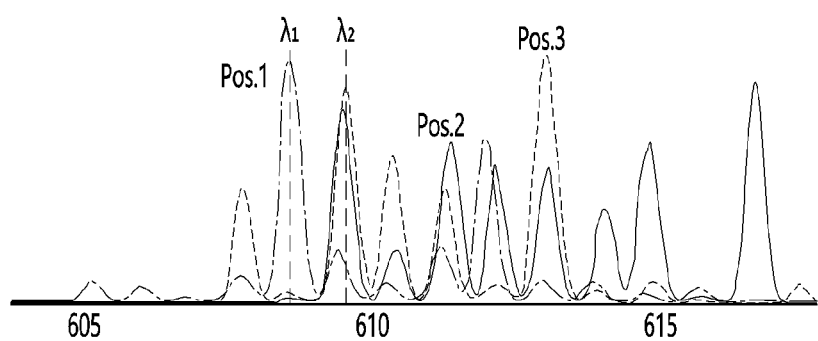
Figure 15A:
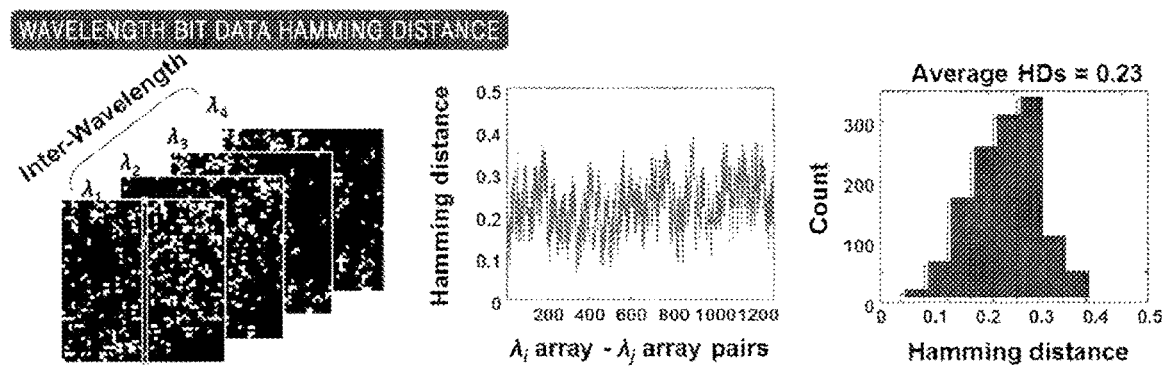
Figure 15B:
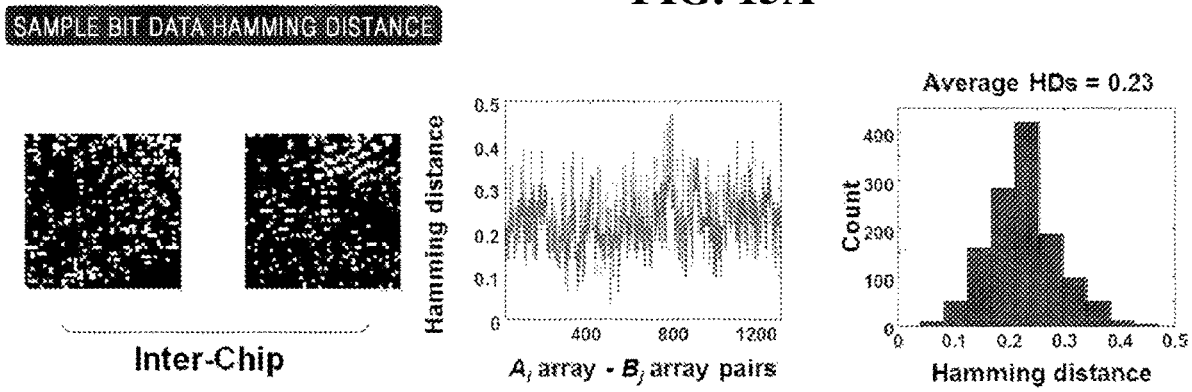

FIGS. 12*a* and 12*b* are views showing a plurality of wavelengths oscillating at a plurality of points.

FIG. 12*a* shows a plurality of points on a plane (x-y plane) on which the lasers oscillate in the random nanostructure and a plurality of wavelengths of the lasers oscillating at the plurality of points.

FIG. 12*b* shows a wavelength $\lambda 1$ at an arbitrary first point among the plurality of points, a wavelength $\lambda 2$ at an arbitrary second point among the plurality of points and a wavelength $\lambda 3$ at an arbitrary third point among the plurality of points.

That is, referring to FIGS. 12*a* and 12*b*, the wavelengths of the laser oscillating at the points are different, and a laser having one wavelength or a plurality of lasers having a plurality of wavelengths may oscillate at one point. In addition, the wavelength of one laser or the wavelengths of the plurality of lasers oscillating at a specific point are unique and may not be changed at the same temperature and the same excitation energy.

From the viewpoint of the points of the plane (x-y plane) on which the lasers oscillate in the random nanostructure, no laser oscillates at some points on the plane (x-y plane) on which the lasers oscillate in the random nanostructure, and lasers oscillate at the other points.

In addition, one laser or a plurality of lasers oscillates at points at which the lasers oscillate.

In addition, one or more lasers oscillating at an arbitrary point among the points at which the lasers oscillate have a certain wavelength at the same temperature and the same excitation energy. For example, at the first point, a laser having a wavelength of 380 nm may constantly oscillate at the same temperature and the same excitation energy and, at the second point, a laser having a wavelength of 380 nm and a laser having a wavelength of 390 nm may constantly oscillate at the same temperature and the same excitation energy.

Meanwhile, when the multi-wavelength characteristics of the random nanostructure are summarized in terms of the wavelength, lasers having the plurality of wavelengths oscillate in the random nanostructure, and the patterns of the lasers having the plurality of wavelengths may be constant at the same temperature and the same excitation energy.

For example, among the plurality of points of the plane (x-y plane) on which the lasers oscillates in the random nanostructure, points at which a laser having a first wavelength (e.g., a wavelength of 380 nm) oscillates may be constant and a direction in which a laser having a first wavelength (e.g., a wavelength of 380 nm) oscillates at the point may also be constant.

As another example, among the plurality of points of the plane (x-y plane) on which the lasers oscillates in the random nanostructure, points at which a laser having a second wavelength (e.g., a wavelength of 390 nm) oscillates may be constant and a direction in which a laser having a second wavelength (e.g., a wavelength of 390 nm) oscillates at the point may also be constant.

The points at which the laser having the first wavelength (e.g., the wavelength of 380 nm) oscillates and the directions of the lasers oscillating at the points at which the laser having the first wavelength (e.g., the wavelength of 380 nm) oscillates may be different from the points at which the laser having the second wavelength (e.g., the wavelength of 390 nm) oscillates and the directions of the lasers oscillating at the points at which the laser having the second wavelength (e.g., the wavelength of 390 nm) oscillates.

In this way, the patterns of the lasers having the plurality of wavelengths (the oscillation points of the lasers and the directions of the lasers) may be different from each other.

FIG. 13 is a view showing a bitmap of pattern images acquired at different wavelengths of the same sample.

The pattern of the laser having the first wavelength $\lambda 1$ oscillating in the same random nanostructure is constant at the same temperature and the same excitation energy.

In addition, the pattern of the laser having the second wavelength $\lambda 2$ oscillating in the same random nanostructure is constant at the same temperature and the same excitation energy.

In addition, it can be seen that the pattern of the laser having the first wavelength $\lambda 1$ oscillating in the same random nanostructure and the pattern of the laser having the second wavelength $\lambda 2$ oscillating in the same random nanostructure are different from each other.

FIGS. 14. 15a and 15b are views illustrating a result of calculating a hamming distance using pattern images acquired at a plurality of wavelengths and a plurality of samples.

A correlation may be verified by bitmapping a plurality of random nanostructures and the pattern images obtained at the plurality of wavelengths and comparing them with each other. In this case, the correlation may be checked by calculating a Hamming distance.

The Hamming distance may be obtained by the following equation.

$$\frac{2}{k(k-1)} \sum_{i=1}^{k-1} \sum_{j=i+1}^{k-1} \frac{HD(A_i, B_j)}{k(k-1)} \times 100\% \quad \text{Equation 2}$$

$A_i = n\text{-bit responses of the arrays } i$ $B_j = n\text{-bit responses of the arrays } j$ The Hamming distances between the plurality of bitmap images (the bitmap image of the laser having the first wavelength, the bitmap image of the laser having the second wavelength, the bitmap image of the laser having the third wavelength and the bitmap image of the laser having the fourth wavelength) respectively corresponding to the plurality of wavelengths (the first wavelength, the second wavelength, the third wavelength and the fourth wavelengths) of the same samples (the same random nanostructure) is 0.23 on average and a maximum Hamming distance is 0.40.

In addition, the Hamming distance between the bitmap images of different samples (the first random nanostructure and the second random nanostructure) obtained at the same wavelength (the first wavelength) is 0.23 on average and a maximum Hamming distance is 0.42.

Meanwhile, the detection apparatus may receive the laser oscillating in the random nanostructure, obtain a pattern image, and perform authentication using the pattern image.

Specifically, the random nanostructure may oscillate a laser having a certain pattern. In addition, when the laser oscillating in the random nanostructure is photographed by the image sensor, the pattern image generated by the image sensor may include pattern information corresponding to the certain pattern.

Accordingly, the pattern image obtained by photographing the laser oscillating in a specific random nanostructure may always be constant at the same temperature and the same excitation energy. For example, the position of a white spot (a spot where a laser is received on the image sensor or a spot where a laser having an intensity greater than a predetermined value is received) on the pattern image may always be constant.

Even when the pattern image is bitmapped and displayed, the position of a white region (a region where a laser is received on the image sensor or a region where a laser having an intensity greater than a predetermined value is received) on the bitmap image may always be constant.

In addition, the pattern image obtained by photographing a laser having a specific wavelength oscillating in a specific random nanostructure may always be constant at the same temperature and the same excitation energy.

Meanwhile, various types of authentication may be performed using the characteristics of the random nanostructure.

For example, the detection apparatus may receive the laser oscillating in the random nanostructure without distinction of wavelength and obtain a pattern image. In this case, lasers having all wavelengths oscillating in the random nanostructure may be photographed to generate a pattern image including pattern information of the lasers having all the wavelengths.

In addition, since the pattern information of the lasers having all the wavelengths are unique due to the characteristics of the random nanostructure, the detection apparatus may perform authentication using the pattern image including the pattern information of the lasers having all the wavelengths.

As another example, the detection apparatus may perform authentication using a pattern image having a specific wavelength among lasers having a plurality of wavelengths oscillating in the random nanostructure.

Specifically, the detection apparatus may receive a laser having a specific wavelength among the lasers having a plurality of wavelengths oscillating in the random nanostructure to obtain a pattern image. To this end, the detection apparatus may include a filter disposed between the random nanostructure and the image sensor, and the filter may pass the laser having the specific wavelength.

In this case, the laser having the specific wavelength oscillating in the random nanostructure may be photographed to generate the pattern image including the pattern information of the laser having the specific wavelength.

In addition, since the pattern information of the laser having the specific wavelength is unique due to the characteristics of the random nanostructure, the detection apparatus may perform authentication using the pattern image including the pattern information of the laser having the specific wavelength.

In addition, the detection apparatus may perform authentication using the pattern images of the lasers having two or more wavelengths among the lasers having the plurality of wavelengths oscillating in the random nanostructure.

This will be described in detail with reference to FIGS. 16a and 16b.

Figure 16A:
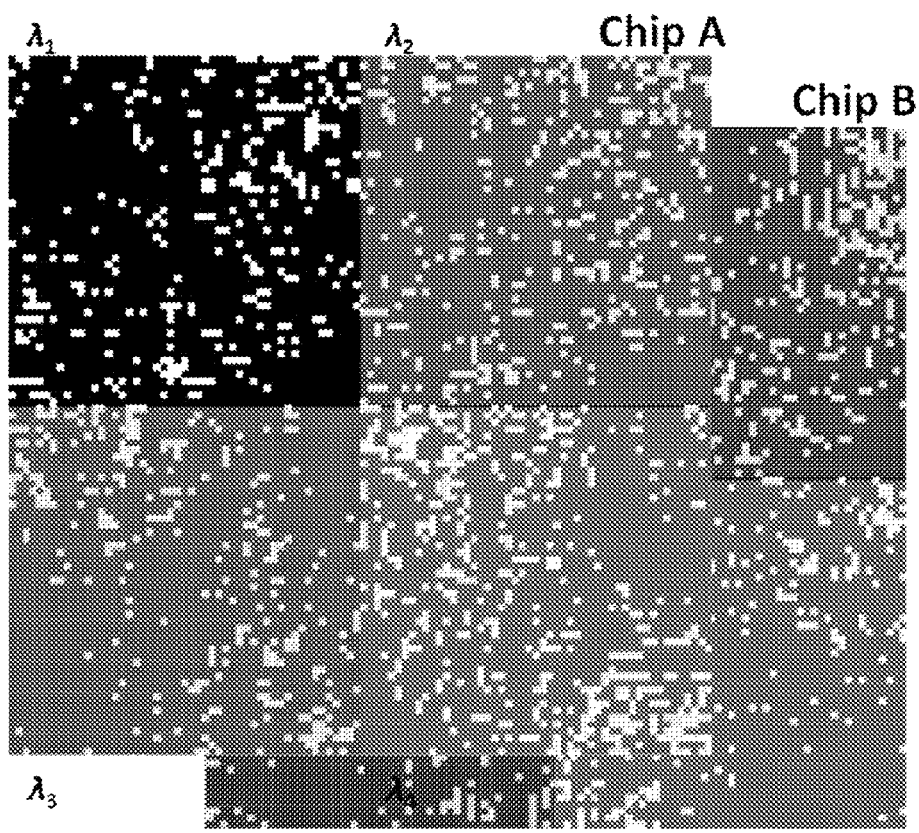
FIGS. 16a and 16b are views illustrating a method of performing authentication using pattern images of lasers having two or more wavelengths among lasers having a plurality of wavelengths oscillating in a random nanostructure.
Figure 16B:
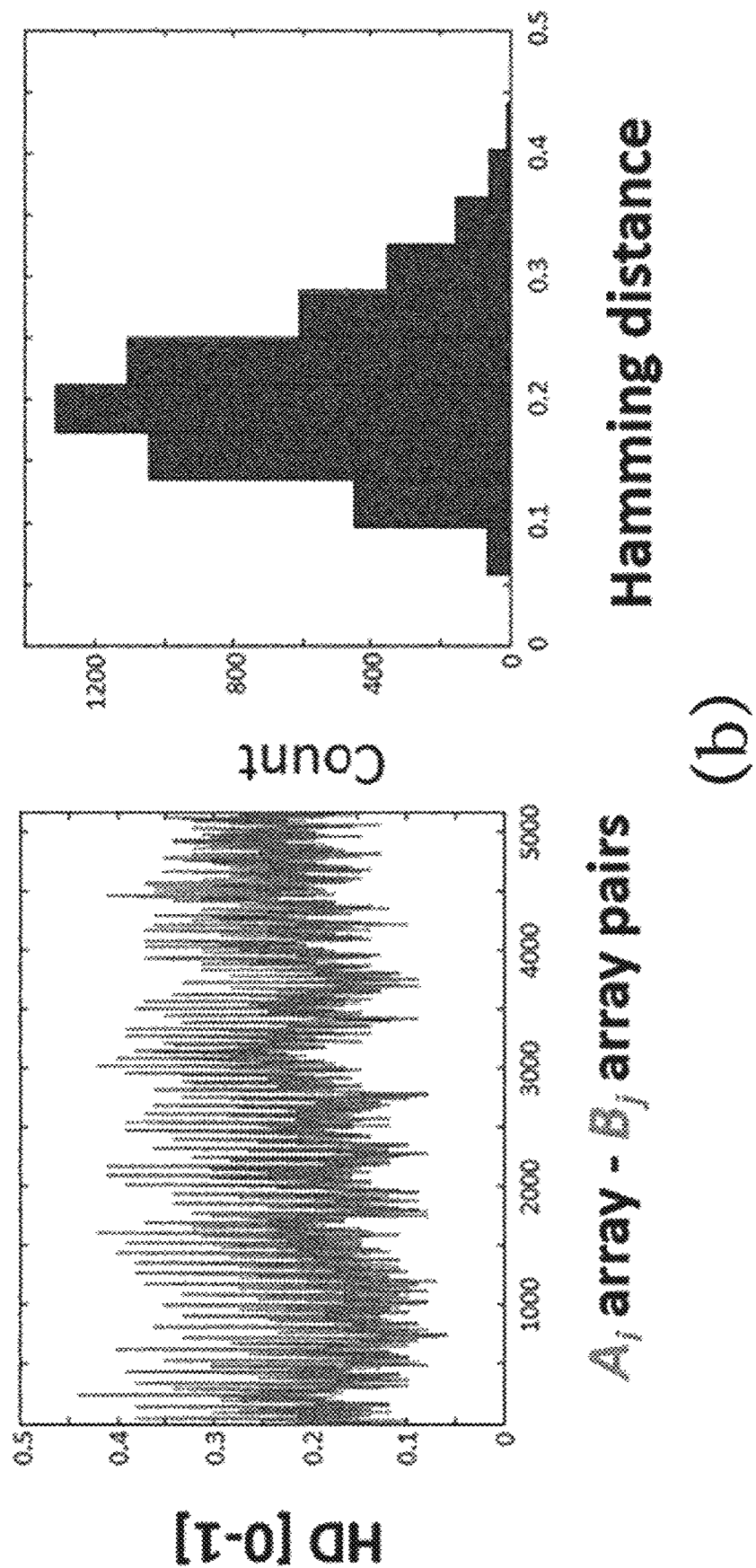

FIGS. 16a and 16b are views illustrating a method of performing authentication using pattern images of lasers having two or more wavelengths among lasers having a plurality of wavelengths oscillating in a random nanostructure.

The detection apparatus may receive the laser having the first wavelength among the lasers having the plurality of wavelengths oscillating in the random nanostructure to obtain a first pattern image, receive the laser having the second wavelength to obtain a second pattern image, receive the laser having the third wavelength to obtain a third pattern image, and receive the laser having the fourth wavelength to obtain a fourth pattern image.

To this end, the detection apparatus may include a filter disposed between the random nanostructure and the image sensor, and the filter may separately pass the lasers having the first wavelength, the second wavelength, the third wavelength and the fourth wavelength.

In this case, the laser having the first wavelength, the laser having the second wavelength, the laser having the third wavelength and the laser having the fourth wavelength oscillating in the random nanostructure may be photographed, thereby generating the first pattern image including the pattern information of the first wavelength, the second pattern image including the pattern information of the second wavelength, the third pattern image including the pattern information of the third wavelength and the fourth pattern image including the pattern information of the fourth wavelength.

In this case, the detection apparatus may perform authentication by comparing the first pattern image, the second pattern image, the third pattern image and the fourth pattern image with authentication information corresponding thereto.

When a plurality of pattern images respectively corresponding to a plurality of wavelengths is used, there is much more bit data as compared to the case of one pattern image obtained without distinction of the plurality of wavelengths or the case of using the pattern image of one of the plurality of wavelengths.

That is, without increasing the area of the random nanostructure, it is possible to substantially obtain the effect of increasing the area of the random nanostructure using multi-wavelength characteristics. Therefore, since the number of bit data usable for encryption increases, it is possible to improve security.

Figure 17:
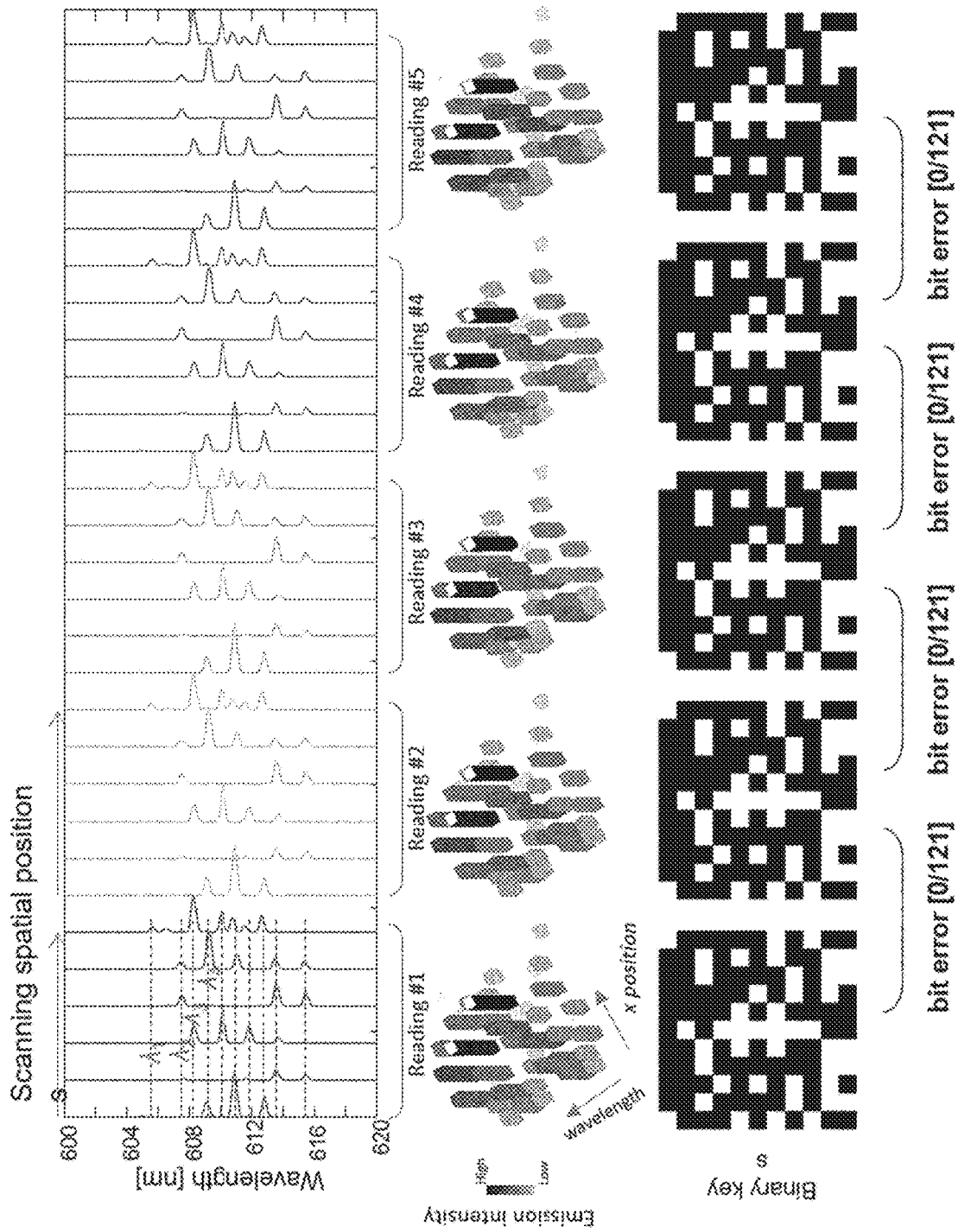
FIG. 17 is a view illustrating the case where a laser pattern of a random nanostructure is not changed even with passage of time.

FIG. 17 is a view illustrating the case where a laser pattern of a random nanostructure is not changed even with passage of time.

In Reading #1, oscillation wavelengths from the first point to the sixth point on the x-y plane were sequentially detected and the detected wavelengths were shown. The six points included in Reading #1 mean the first point to the sixth point from left to right. In addition, the pattern image from which the lasers oscillating at the first point to the sixth point in Reading #1 are detected are shown.

In addition, in Reading #2, returning to the first point again, oscillation wavelengths from the first point to the sixth point were sequentially detected and the detected wavelengths were shown. The six points included in Reading #2 mean the first point to the sixth point from left to right. In addition, the pattern image from which the lasers oscillating at the first point to the sixth point in Reading #1 are detected are shown.

In addition, the same process was repeated in Reading #3, Reading #4 and Reading #5.

In Reading #1 to Reading #5, it can be seen that the wavelengths of the lasers oscillating at the points are the same. For example, it can be seen that all the wavelength of the laser oscillating at the first point included in Reading #1, the wavelength of the laser oscillating at the first point included in Reading #2, the wavelength of the laser oscillating at the first point included in Reading #3, the wavelength of the laser oscillating at the first point included in Reading #4, the wavelength of the laser oscillating at the first point included in Reading #5, and the wavelength of the laser oscillating at the first point included in Reading #6 are the same.

In addition, it can be seen that all the pattern images from which the patterns of the lasers are detected in Reading #1 to Reading #5 are the same (bit error 0).

That is, this means that the random nanostructure emits lasers having the same pattern with passage of time and thus the random nanostructure is a good device which may be used as a physical unclonable apparatus.

FIGS. 18a, 18b and 18c are views showing data for comparison between a general laser and a random laser.

Referring to FIG. 18a, a general laser includes a resonance structure including opposing mirrors and a gain medium, and operates by the gain medium included in the cavity structure.

In contrast, the random laser has a disordered structure as shown in FIG. 18b. Meanwhile, a gain medium for emitting light between a scattering material and a scattering path is necessary for the random laser to oscillate by forming a virtual resonance structure in the random nanostructure having the disordered structure.

In the following table, materials which may be used in the random nanostructure in which the virtual resonance structure is formed will be described.

TABLE 1

| scatter | gain |
| --- | --- |
| ZnO | ZnO |
| ZnO/Al2O3 | Zno |
| ZnS | ZnS |
| BaSO4 | BaSO4 |
| GaN | GaN |
| GaAs | GaAs |

Here, scatter may include a scattering medium and gain may include a gain medium. In addition, one of the materials described in Table 1 may function as both the scattering medium and the gain medium.

Next, two materials which may configure the random nanostructure will be described in Table 2.

TABLE 2

| scatter | gain |
| --- | --- |
| TiO2 | ZnO |
| PDMS/TEOS | ZnO |
| Photonic crystal | Quantum dot |
| Photonic crystal | InGaAsP |
| Nd + 3 doped glass | Nd + 3 doped glass |
| Glass substrate | CdSe/ZnS |
| SnO2 | SnO2 |

The random nanostructure may include a first material functioning as a scattering medium and a second material functioning as a gain medium. For example, in the random nanostructure, TiO2 functioning as the scattering medium forms a scattering structure, and ZnO may be located in the TiO2 structure, that is, on a light feedback loop to function as the gain medium.

As an example of the method of generating the random nanostructure, the random nanostructure may be generated by forming nanorods composed of TiO2 to make a scattering structure and spraying ZnO nanoparticles on the nanorods composed of TiO2.

In addition, a method of mixing the gain medium and the scattering medium in the form of nanoparticles is possible.

Meanwhile, a material having high reflectance in a gain wavelength band may be used in the scattering material and a material having high gain efficiency may be used in the gain medium.

In addition, like a Photonic crystal-Quantum dot pair, it is possible maximize efficiency by configuring the gain medium using a quantum dot instead of a general single material.

Next, two materials which may configure the random nanostructure will be described in Table 3.

TABLE 3

| Scatter | Gain |
| --- | --- |
| ZnO | Dye |
| TiO2 | Dye |
| TiO2/SiO2 | Dye |
| TiO2 | DOO-PW |
| Glass | Dye |
| Liquid Crystal | Dye |
| Latex nanoparticle | Dye |
| Ag@SiO2 | Dye |
| Silver nanoparticle | Dye |
| Gold nanoparticle | Dye |
| Bone tissue | Dye |
| Human tissue | Dye |

The random nanostructure may include a first material functioning as a scattering medium and a second material functioning as a gain medium. In addition, in Table 3, polymer may be used as the second material. That is, since the polymer emits light as a fluorescent material, a method of using general materials as a scattering medium and using polymer as a gain medium is possible.

Figure 19A:
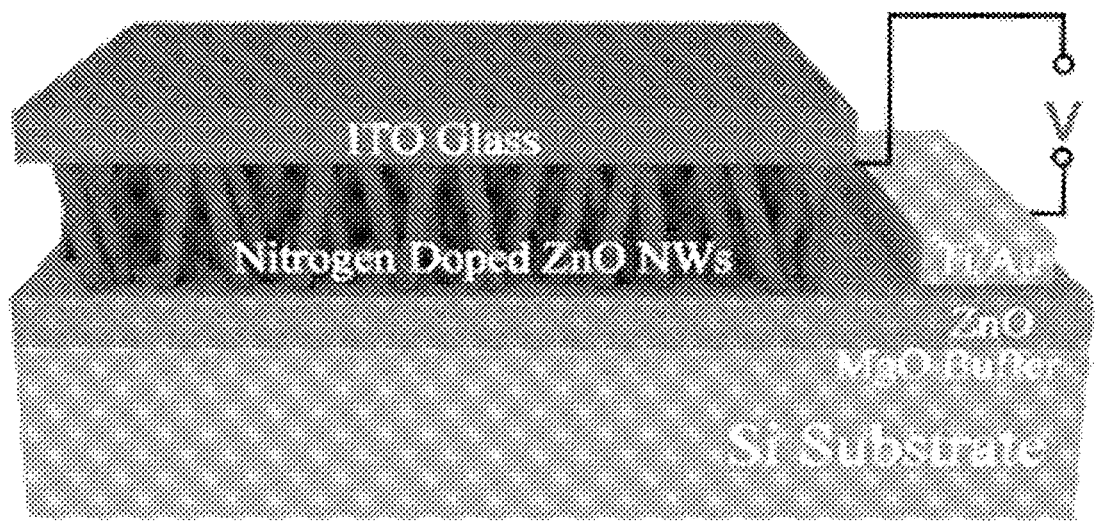
FIGS. 19a, 19b and 20 are views illustrating an excitation method of a random nanostructure according to an embodiment of the present invention.
Figure 19B:
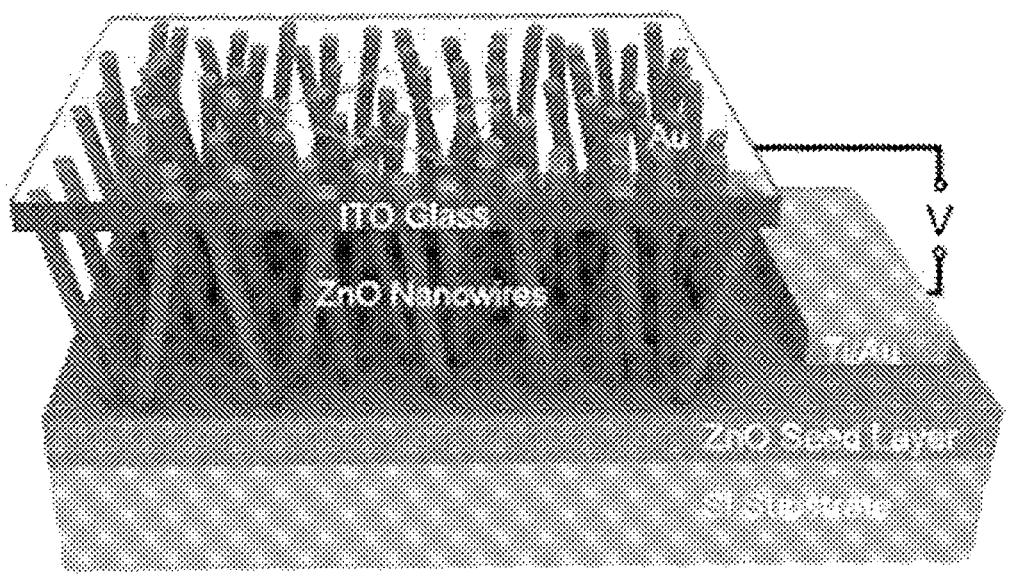
Figure 20:
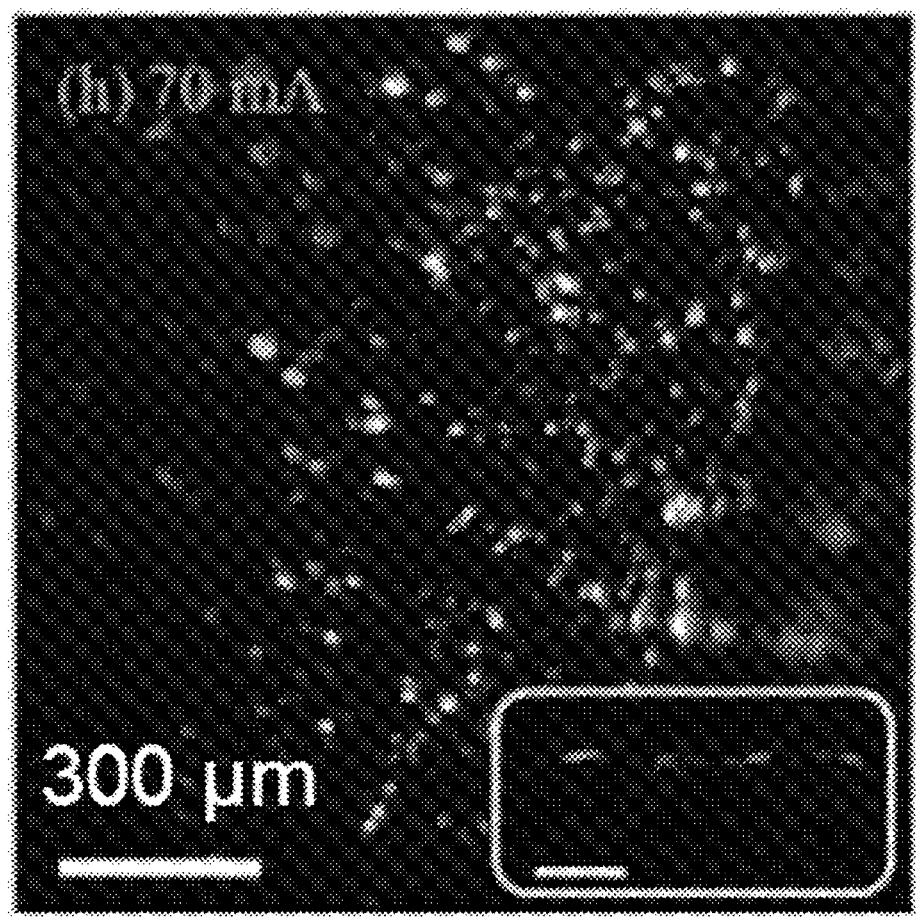

FIGS. 19a, 19b and 20 are views illustrating an excitation method of a random nanostructure according to an embodiment of the present invention.

In FIGS. 19a and 19b, the case where electrical energy is used as excitation energy for exciting the random nanostructure will be described.

When a voltage is applied in a state of bonding electrically conductive materials to a lower surface of a seed layer (or a lower surface of a random nanostructure) and an upper surface of the random nanostructure and electrically connecting the electrically conductive material on the lower surface of the seed layer with the electrically connected material on the upper surface of the random nanostructure, current flows through the random nanostructure.

In this case, as shown in FIG. 20, a laser may oscillate from the random nanostructure.

When a zinc oxide random nanostructure is used, the color of the laser is blue, sky blue or purple, which means that lasers having a plurality of wavelengths oscillate in an emission spectrum of the zinc oxide random nanostructure.

In addition, the pattern of such a laser (the position where the laser is displayed on the pattern image) may be used for authentication.

Returning to FIGS. 19a and 19b again, it is advantageous to use an electrical random laser device for miniaturization and performing of steps which may be practically used in a hardware stage.

In addition, the electrical random laser device may be manufactured using a semiconductor process.

Specifically, there are a case of inducing light emission from ZnO nanowires using PN junction as shown in FIG. 19a and a case of emitting light from Zno nanowires using Schottky junction as shown in FIG. 19b.

When the electrical random laser device manufactured in this way operates, as shown in FIG. 20, lasing spots are randomly distributed in a space due to Anderson localization. In addition, the random distribution of light in the space continues to be stably maintained when the device operates, and the devices have different characteristics to be implemented as physical unclonable function devices.

In addition, the size of the device may be adjusted in the process and may be miniaturized.

Figure 22:
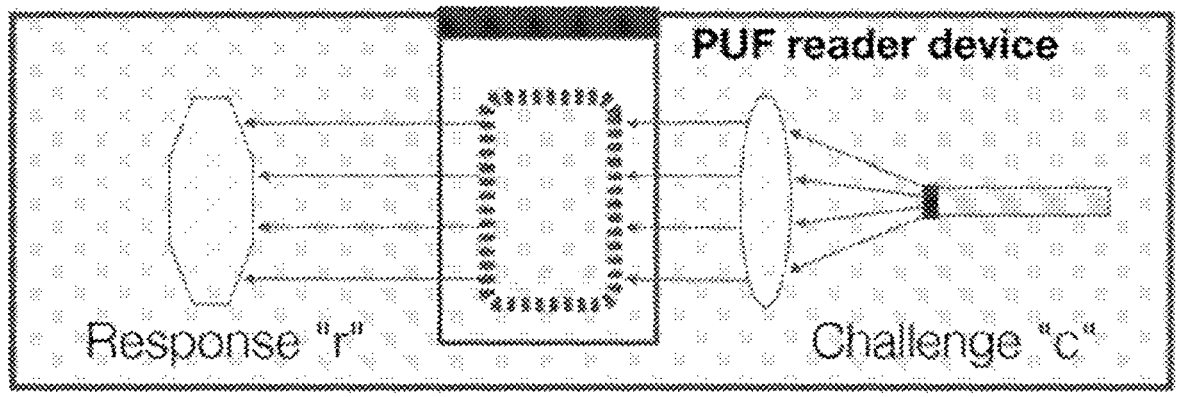
Figure 23:
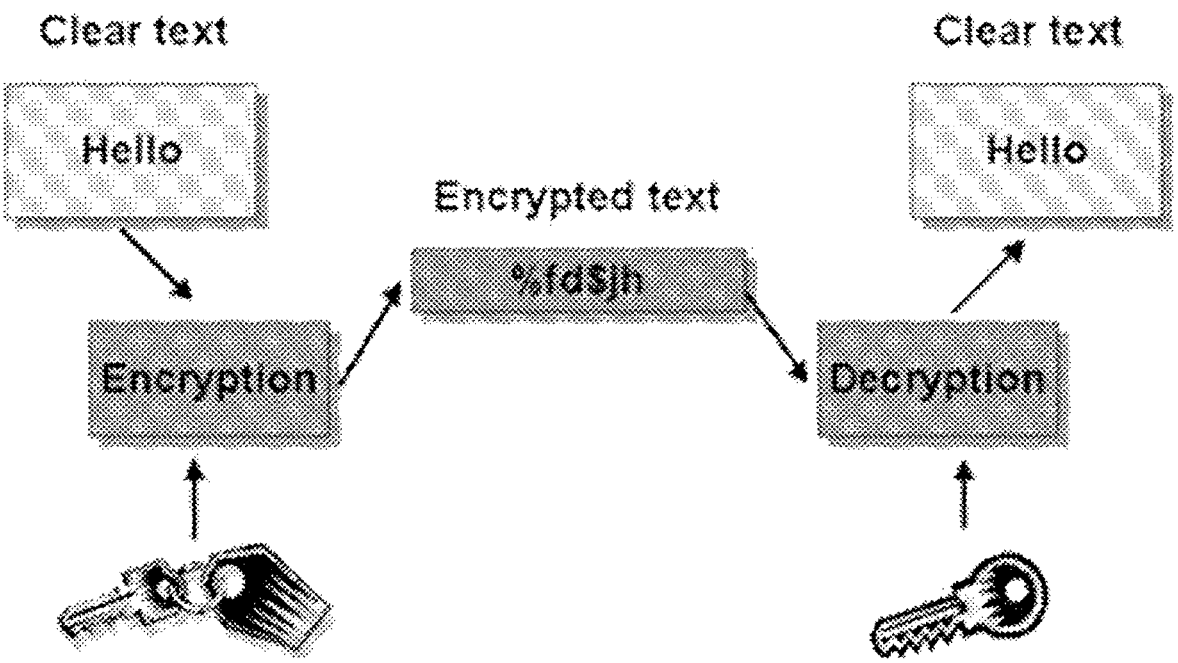

FIGS. 21 to 23 are views illustrating a method of utilizing a random laser device for hardware security.

In order to mount a physically unclonable function (PUF) apparatus in hardware, the detection apparatus may include an image sensor and a holder capable of placing a random laser device above the image sensor.

In addition, the detection apparatus may include an energy supply unit for supplying excitation energy (e.g., power) to the physical unclonable function apparatus. In this case, a power supply may be connected to the energy supply unit (e.g., the lower of the seed layer (or the lower surface of the random nanostructure) and the conductive layer bonded to the upper surface of the random nanostructure) included in the physical unclonable function device to supply excitation energy to the random nanostructure.

In addition, the detection apparatus may include a filter for selecting and passing a plurality of wavelengths oscillating in the PUF device to the image sensor.

Meanwhile, when the physical unclonable function apparatus located on the holder operates, light subjected to Anderson localization is input to the image sensor and authentication is performed using a pattern generated on a pattern image, thereby utilizing the random nanostructure as the PUF device.

In this case, the random nanostructure may be used as a KEY storage. When the random nanostructure is used as the key storage, since the key is not stored in a physical memory, it is difficult to find out the key from the outside. This may help with security, and the key may be used for encryption and thus may be used for an authentication procedure and encryption in an embedded system.

According to the present invention, by generating a physical structure having randomness in a process and generating a random pattern having quantum-based random characteristics by quantum activity in a random structure, the oscillation pattern of the laser follows the Poisson distribution. That is, even when a PUF device is manufactured using the same method, the unique characteristics thereof cannot be cloned.

In addition, according to the present invention, since the PUF device is manufactured using randomness based on various physical phenomena such as semiconductor manufacturing processes using silicon, compound combination or optics, this may be applied to various advanced security apparatuses as the physical security technology with strong security performance.

In addition, according to the present invention, since multi-wavelength and multi-mode oscillation occurs due to light scattering characteristics and a virtual resonance structure, the amount of information which may be used for security may increase, thereby improving security.

In addition, the random nanostructure very stably emits the same pattern at the same temperature and current, thereby being very advantageously used as an encryption device.

In addition, the manufacturing process is very easy, thereby generating a large number of keys.

The above detailed description should not be construed as limiting in all respects and should be considered as illustrative. The scope of the present invention should be determined by reasonable interpretation of the appended claims, and all changes within the equivalent scope of the present invention are included in the scope of the present invention.

The invention claimed is:

1. A quantum-based physical unclonable function (PUF) system, the system comprising a quantum-based physical unclonable function apparatus and a detection apparatus,
    wherein the quantum-based physical unclonable function apparatus comprising a random nanostructure formed on a substrate by a hydrothermal synthesis method,
    wherein the random nanostructure oscillates a laser having a certain pattern through quantum activity of the random nanostructure, when an excitation energy of a light energy having a predetermined value is input to the random nanostructure, the laser having the certain pattern oscillates by a virtual resonance structure formed by a shape of the random nanostructure,
    wherein the pattern follows a Poisson distribution,
    wherein the hydrothermal synthesis method comprises:
        providing a seed layer directly on the substrate by sputtering without an intervening electrode layer; and
        putting the substrate into a solution to grow the random nanostructure directly on the seed layer without an intervening masking layer having an opening, wherein the random nanostructure is grown by changing at least one of a molar concentration of the solution, a growth time or a growth temperature;
    wherein the random nanostructure comprises a plurality of nanorods aligned disorderly on the seed layer,
    wherein the plurality of nanorods grows in a first direction on the seed layer, the first direction is near to the vertical direction to the seed layer, the first direction is far from the horizontal direction to the seed layer; and
    wherein the plurality of nanorods is at least irregularly spaced apart each other,
    wherein the detection apparatus comprises:
        an image sensor for receiving the laser oscillating in the random nanostructure to acquire an image, and
        a filter disposed between the random nanostructure and the image sensor, wherein the filter provides each pattern image of a laser having a specific wavelength corresponding with the filter,
    wherein the detection apparatus uses at least two pattern images provided by the filter,
    wherein the detection apparatus performs authentication using each of the at least two pattern images and each authentication image of authentication images distinguishable by a wavelength.

2. The quantum-based PUF apparatus of claim 1, wherein the random nanostructure has a different shape from another random nanostructure generated under the same generation condition and oscillates the laser having a different pattern.

3. The quantum-based PUF apparatus of claim 1, wherein the certain pattern includes at least one of an oscillation point of the laser, an oscillation direction of the laser or a wavelength of the laser.

4. The quantum-based PUF apparatus of claim 1,
    wherein the random nanostructure oscillates lasers having a plurality of wavelengths,
    wherein the patterns of the lasers having the plurality of wavelengths are constant at the same temperature and the same excitation energy, and
    wherein the patterns of the lasers having the plurality of wavelengths are different from each other.

5. The quantum-based PUF apparatus of claim 1,
    wherein the random nanostructure is composed of a specific material functioning as both a scattering medium and a gain medium, and
    wherein the specific material is any one of ZnO, ZnS, BaSO4, GaN and GaAs.

6. The quantum-based PUF apparatus of claim 1, wherein the random nanostructure includes a first material functioning as a scattering medium and a second material functioning as a gain medium.

* * * * *